United States Patent [19]

Castens

[11] Patent Number: 5,219,053
[45] Date of Patent: Jun. 15, 1993

[54] UNIDIRECTIONAL CLUTCH WITH SHELL RACES

[75] Inventor: Rudolf R. Castens, Leiden, Netherlands

[73] Assignee: Hybo Science, Inc., Delray Beach, Fla.

[21] Appl. No.: 933,961

[22] Filed: Aug. 21, 1992

Related U.S. Application Data

[63] Continuation of Ser. No. 718,217, Jun. 20, 1991, abandoned, which is a continuation-in-part of Ser. No. 418,795, Oct. 3, 1989, Pat. No. 5,067,601, which is a continuation of Ser. No. 112,638, Oct. 22, 1987, which is a continuation-in-part of Ser. No. 16,458, Feb. 18, 1987, abandoned, which is a continuation-in-part of Ser. No. 821,453, Jan. 22, 1986.

[30] Foreign Application Priority Data

Jan. 24, 1985 [GB] United Kingdom ................ 8501822

[51] Int. Cl.⁵ .................... F16D 41/06; F16D 43/00
[52] U.S. Cl. ........................................ 192/45; 192/65
[58] Field of Search ................... 192/65, 66, 38, 45

[56] References Cited

U.S. PATENT DOCUMENTS

| | | |
|---|---|---|
| Re. 17,489 | 11/1929 | Anderson . |
| Re. 18,789 | 4/1933 | Gahagan . |
| Re. 32,346 | 2/1987 | Klamer et al. ............ 280/11.2 |
| 533,912 | 2/1895 | Moise . |
| 1,047,551 | 12/1912 | Myers . |
| 1,190,714 | 7/1916 | Bottome . |
| 1,376,033 | 4/1921 | Page . |
| 1,423,666 | 7/1922 | Langhaar . |
| 1,555,939 | 10/1925 | Brisbois . |
| 1,736,837 | 11/1929 | Reich . |
| 1,878,556 | 9/1932 | Vincent . |
| 1,901,714 | 3/1933 | Vincent . |
| 1,929,782 | 10/1933 | Hughes ...................... 192/48.92 |
| 1,955,879 | 4/1934 | Griswold . |
| 2,009,964 | 7/1935 | Mottlau ........................... 192/45 |
| 2,064,230 | 12/1936 | Starr . |
| 2,187,471 | 1/1940 | Hutchinson . |
| 2,211,548 | 8/1940 | Schwinn ........................... 192/64 |
| 2,323,753 | 7/1943 | Jaeger et al. . |
| 2,345,972 | 4/1944 | Hardy ............................... 192/50 |
| 2,451,621 | 10/1948 | Houston ........................... 74/205 |
| 2,493,418 | 1/1950 | Orshansky, Jr. . |
| 2,547,453 | 4/1951 | Egy ................................. 74/679 |
| 2,633,951 | 4/1953 | Ayer et al. ..................... 192/45 |
| 2,816,458 | 12/1957 | Castrow ......................... 74/679 |
| 2,892,522 | 6/1959 | Moo ................................. 192/45 |
| 3,147,595 | 9/1964 | Liang . |
| 3,163,988 | 1/1965 | Gabriel . |
| 3,212,405 | 10/1965 | Smith ................................ 90/11 |
| 3,229,549 | 1/1966 | Riedl ............................... 74/640 |
| 3,247,727 | 4/1966 | Digby et al. ....................... 74/7 |
| 3,447,396 | 6/1969 | Seliger ............................. 74/650 |
| 3,557,921 | 1/1971 | Takada ............................. 192/45 |
| 3,779,654 | 12/1973 | Horne ............................... 403/62 |
| 3,790,187 | 2/1974 | Radu et al. ..................... 280/11.2 |
| 3,800,927 | 4/1974 | Takata ............................ 192/45 |

(List continued on next page.)

FOREIGN PATENT DOCUMENTS

| | | |
|---|---|---|
| 230739 | 10/1960 | Australia . |
| 53-93241 | 8/1978 | Japan . |
| 63-219922 | 9/1988 | Japan . |
| 8903941 | 5/1989 | PCT Int'l Appl. . |
| 452700 | 3/1973 | U.S.S.R. . |
| 1254342 | 11/1971 | United Kingdom . |
| 1368738 | 10/1974 | United Kingdom . |
| 1368739 | 10/1974 | United Kingdom . |
| 1550175 | 8/1979 | United Kingdom . |
| 190017A | 8/1986 | United Kingdom . |
| 312656A | 4/1989 | United Kingdom . |

*Primary Examiner*—Rodney H. Bonck
*Attorney, Agent, or Firm*—Malin, Haley, DiMaggio & Crosby

[57] ABSTRACT

A positive axial clutch of the hyperboloidal type whereupon engagement transmits torque in one direction and freewheel or overrun is allowed when disengaged. The apparatus utilizes an inner race coupled to an inner race element such as a shaft, an outer race member coupled to an outer race element such as a sprocket designed to rotate in one direction relative to the shaft with an annular volume formed therebetween in which a plurality of thrust transmitting rollers are disposed.

2 Claims, 5 Drawing Sheets

U.S. PATENTS DOCUMENTS

| | | | |
|---|---|---|---|
| 3,817,494 | 6/1974 | Eckerdt | 254/187 |
| 3,818,855 | 6/1974 | Shimanckas | 115/34 R |
| 3,874,253 | 4/1975 | Waddington | 74/804 |
| 3,885,544 | 5/1975 | Pfeiffer | 123/179 SE |
| 3,930,341 | 1/1976 | Neuman | 51/89 |
| 3,937,311 | 2/1976 | Gehrke | 192/45 |
| 3,942,616 | 3/1976 | Elmore | 192/45 |
| 3,993,178 | 11/1976 | Mendoza-Orozco | 192/64 |
| 4,022,308 | 5/1977 | Hurst | 192/21 |
| 4,046,238 | 9/1977 | Mendoza-Orozco | 192/45 |
| 4,159,830 | 7/1979 | Solimine | 280/11.28 |
| 4,181,043 | 1/1980 | Waddington | 74/750 B |
| 4,291,505 | 9/1981 | Taniishi et al. | 51/289 R |
| 4,302,196 | 11/1981 | Blanchard | 440/75 |
| 4,375,739 | 3/1983 | Machida et al. | 51/58 |
| 4,418,947 | 12/1983 | Talafuse | 285/168 |
| 4,441,315 | 4/1984 | Bochot | 60/345 |
| 4,461,375 | 7/1984 | Brown | 192/45 |
| 4,462,490 | 7/1984 | Hattori | 192/0.076 |
| 4,493,316 | 1/1985 | Reed et al. | 128/80 C |
| 4,553,767 | 11/1985 | Robjent et al. | 280/11.21 |
| 4,574,649 | 3/1986 | Seol | 74/138 |
| 4,637,802 | 1/1987 | Taguchi et al. | 440/75 |
| 4,644,828 | 2/1987 | Kozakae | |
| 4,656,789 | 4/1987 | Schwar | 51/105 R |
| 4,683,998 | 8/1987 | Cigdem et al. | 192/58 C |
| 4,693,351 | 9/1987 | Adolfsson | 192/48.92 |
| 4,705,411 | 11/1987 | Kellstrom | 384/450 |
| 4,720,001 | 1/1988 | Jensen | 192/13 R |
| 4,770,279 | 9/1988 | Shiozaki et al. | 192/45 |
| 4,795,474 | 1/1989 | Horvath | 623/27 |
| 4,883,152 | 11/1989 | Froment | 192/42 |
| 4,907,466 | 3/1990 | Kuhn | 74/378 |
| 4,989,704 | 2/1991 | Morishita et al. | 192/45 |
| 5,024,307 | 6/1991 | Wakabayashi | 192/40 |
| 5,048,635 | 9/1991 | Wakabayashi et al. | 180/247 |
| 5,067,601 | 11/1991 | Castens | 192/65 |

UNIDIRECTIONAL CLUTCH WITH SHELL RACES

This is a continuation of copending application Ser. No. 07/718,217 filed on Jun. 20, 1991 which is a continuation-in-part of Ser. No. 07/418,795 filed Oct. 3, 1989, now issued as U.S. Pat. No. 5,067,601 on Nov. 26, 1991, which is a continuation of Ser. No. 07/112,638 filed Oct. 22, 1987, now abandoned, which is a continuation-in-part of Ser. No. 07/016,458 filed Feb. 18, 1987, now abandoned, which is a continuation-in-part of Ser. No. 06/821,453 filed Jan. 22, 1986, now abandoned.

BACKGROUND OF THE INVENTION

Field of the Invention

The present invention relates to a one-way clutch and, in particular, relates to an improved lightweight, compact positive clutch which transmits torque in one direction and freewheels in the opposite direction and which acts as a true roller bearing in the freewheel mode. The invention provides for the use of cast, stamped, extruded, or otherwise formed molded, thin lightweight inner and outer races having minimum wall thickness.

Description of the Related Art

One way clutches of various types are presently known. Of such clutches, one of the best known is the sprag clutch, which includes inner and outer races having a number of so called sprags held in position by a cage. Another is the ramp roller clutch, which includes inner and outer races having a plurality of needle rollers adjacent a ramp surface on the outer race. The sprags of the sprag clutch are configured such that rotation of one race in a first direction causes camming engagement of the sprags with the respective surfaces, whereas rotation in the opposite direction causes freewheeling of the clutch due to the fact that the sprags do not cam the surfaces in that direction. The needle rollers of the ramp roller clutch are brought into jamming, torque transmitting, engagement between the ramp surface and the inner race upon rotation of one race relative to the other in a first direction, whereas relative rotation in the opposite direction causes freewheeling. Nearly all of the clutches known in the prior art utilize components which are ground or otherwise machined from a solid piece of material such as hardened steel, reducing diversity of available race contours while greatly increasing cost to manufacture. Producing a clutch with inner and outer races having minimum wall thickness that can be molded, cast, etc. allows for a variety of shapes at low mass production costs.

None of the devices known in the art disclose a positive axial clutch wherein the inner and outer clutch race members are stamped, of the hyperboloidal-type wherein the inner and outer clutch race members are stamped, pressed or otherwise formed out of thin carbonized sheet steel, ceramic or other suitable material and which define race surfaces shaped similarly to a hyperboloid as described herein between which rollers are positioned to provide torque transmission between the races in a first direction of relative rotation, while causing freewheeling in a second, opposite, direction of rotation, while supporting the rollers axially and slidably for rotation in such freewheeling direction. By a "positive" clutch is meant a clutch which will transmit torque without slip.

Some clutches known in the prior art require that a working element of a mechanism be the inner race member. An example of the foregoing is a miniature one-way clutch manufactured by the Koyo Corporation of U.S.A., Westlake, Ohio, comprised of a stamped thin outer race member surrounding a plurality of needle rollers arranged parallel to the axis of rotation of the clutch, the rollers being rotatably nestled within both a cage and corresponding mating pockets formed in the outer race. The inner race is the rotatable shaft of the mechanism in which the clutch is installed. The Koyo clutch operates essentially the same as a ramp roller clutch and shares characteristics therewith of high friction, heat and wear. Because placement of the rollers is dictated exclusively by the diameter of the inner race/shaft, the Koyo device is entirely unsuitable under higher torque conditions where placement of the rollers should be radially distant from the axis of rotation of the clutch. Further, because the rollers of Koyo do not spin in place, the friction and hence wear against the outer race, leads to premature failure of the device.

In addition, none of the devices in the prior art disclose a unidirectional clutch wherein the inner or outer races are stamped or otherwise formed of thin, carbonized sheet steel, nylon, ceramic or suitable plastic and which provides a bearing function in the freewheel direction with very little slippage between the rollers and the inner and outer races.

SUMMARY OF THE INVENTION

The object of the present invention is to provide an improved clutch of the hyperboloidal type which may be engaged and disengaged and which may be adapted to transmit torque in one direction, when engaged, yet to freewheel or overrun in the opposite direction when disengaged, wherein the inner and outer race members are stamped or otherwise formed from relatively thin and hence lightweight material, and which inner and outer races are adapted to be fixedly connected to inner and outer race-connected elements, respectively.

It is also an object of the present invention to provide a clutch as set forth herein which is lightweight and compact yet transmits substantial torque from one element to another.

The improved unidirectional freewheel or clutch member is comprised generally of four elements: an inner race member rigidly connected to an inner race element such as a shaft; an outer race member rigidly connected to an outer race element such as a sprocket or other member adapted to rotate in one direction relative to said rotatable shaft, yet be fixed relative to said rotatable shaft with respect to rotation in the opposite direction, said outer race member surrounding the inner race member and defining therewith confronting inner and outer race surfaces and an annular volume therebetween; a plurality of cylindrical, inclined thrust transmitting rollers disposed in said annular volume; and bearing means associated with at least on end of said clutch at the interface of first ends of said rollers and said first end of the clutch. The inner and outer race surfaces converge in parallel with respect to the axis of rotation of the clutch when moving from the first end to the second end of the clutch.

The contours of the confronting inner and outer race surfaces are generated by the lines of contact between the inner race surface and the rollers and the lines of contact of the outer race surface and the rollers.

Thus, the contour of the race surfaces is a function of the diameter of the rollers, the diameter of the throat of the clutch at the inner or outer race, the angle of inclination of the rollers relative to radial planes, and Z, the distance from the throat of the clutch to the point being measured.

It should be noted that the longitudinal axes of rotation of the needle rollers define a surface of revolution about the axis of rotation of the clutch, which surface is a hyperboloid through ever point on which two straight line generators (the axes of rotation of said rollers) may be drawn so as to lie wholly in the surface of revolution. Each roller, on the other hand, contacts the inner and outer race surfaces along a generator of said surfaces, which would appear as helical lines traversing the length of each roller for each race surface. The rollers are all similarly inclined with respect to radial planes, i.e.: planes passing at right angles through the central axis of the clutch. The invention may further comprise means at the interface between the rollers and at least one of the first and second race members to provide slidable movement therebetween at least in a first direction while supporting the rollers axially thereof.

According to my present invention, the inner and outer races are formed in a thin, lightweight configuration with the inner and outer race surfaces approximating hyperboloidal surfaces having a diameter at a first end portion of each race member greater than the diameter at the second end portion of each member. Further, the clutch according to the present invention includes said inner and outer race members which are axially fixed, whereby attempted relative rotation of the race members in one direction causes non-slip thrust transmitting engagement of the rollers between the confronting surfaces, and relative rotation in the other direction breaks the thrust transmitting engagement by reducing the tangent angle between the rollers and the curving ramp surface of the inner race.

It should be noted that the angle of inclination of the rollers with respect to said radial planes remains constant in both the freewheeling and thrust transmitting modes.

DETAILED DESCRIPTION OF THE PREFERRED EMBODIMENT

Figure 1:
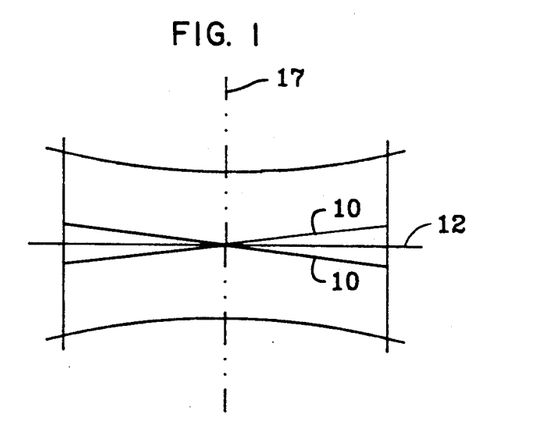
FIG. 1 is a schematic diagram illustrating a hyperboloidal surface with straight line generators.

With reference now to the accompanying drawings and first to FIG. 1 there is illustrated a hyperboloid of one sheet defined as a ruled surface which is such that through every point of the surface, two straight lines, such as illustrated at 10 and called generators, can be drawn so as to lie entirely in the surface. The hyperboloid illustrated is a surface of revolution about the central axis 12, which is the axis of rotation of the positive, axial clutch to be described hereinbelow. With respect to the invention disclosed herein, the generators 10 of FIG. 1 coincide with the axis of rotation of the cylindrical rollers 26 to be more fully set forth below.

Figure 2:
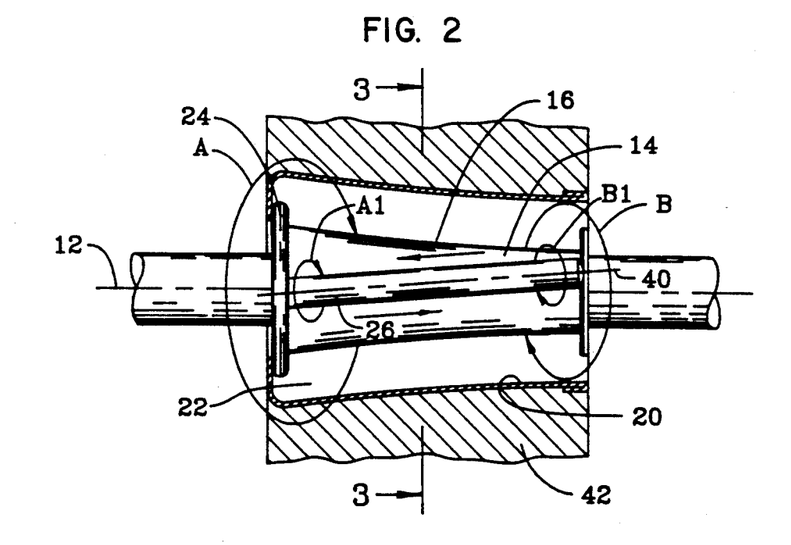
FIG. 2 is a diagrammatic cross-sectional elevational representation illustrating the principles of a unidirectional clutch constructed in accordance with the present invention.
Figure 3:
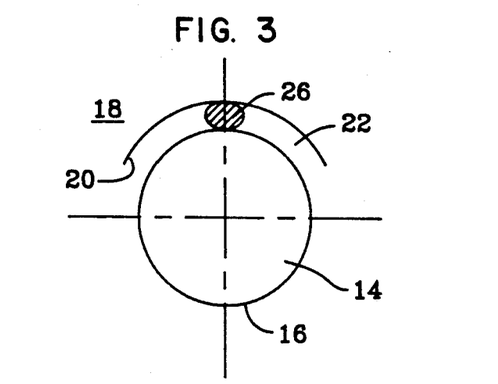
FIG. 3 is a cross-sectional plan view of the clutch of FIG. 2 taken along lines 3—3 of FIG. 2.

Referring now to FIGS. 2 and 3, the present clutch comprises a first and inner member 14 (inner race) stamped or otherwise formed out of thin-walled material, defining a surface of revolution 16 (inner race surface) about the clutch axis 12 said surface defined and generated by the lines of constant contact between rollers 26 and said inner race surface 16. Although the surface contour of inner race surface 16, and for that matter outer race surface 20, are not truly hyperboloidal, for purposes of this disclosure, and particularly of the preferred embodiment, this description shall refer to that part of the hyperboloid shown in FIG. 1 immediately to the left hand side of the radial plane defined by the chain dotted line. Such radial plane passes through the throat or minimum diameter section of the clutch.

The clutch further includes a second or outer race member 18 which may be stamped or otherwise formed from a suitable material into a thin-walled configuration having an outer race surface 20 formed as a surface of revolution about the clutch axis 12, said surface defined and generated by the lines of constant contact between said surface 20 and the rollers 26 in like fashion to that of inner race surface 16. A plurality of thrust transmitting cylindrical needle rollers 26 of radius R are disposed in the volume 22 defined by the confronting inner and outer race surfaces 16 and 20, respectively, so as to make contact with said surfaces 16 and 20 along generators thereof, all of said rollers being similarly inclined with respect to radial planes. At least three said rollers 26 equally spaced apart are required for the clutch to function properly.

The rollers 26 make contact with the surfaces 16 and 20, each along a line which winds somewhat helically with respect to the roller axis. These helically curving lines of contact of the rollers 26 with the surfaces 16 and 20 can be said to approximate to said generators 10 of a hyperboloid and approach such generators as the radius R of the rollers goes to zero.

Referring now to FIGS. 2 and 3, rotation of the outer member 18 relative to the inner member 14 in the direction of arrow A causes the rollers to rotate in that same direction about their own axes and therefore to be urged to move in the direction of arrow A1 relative to inner member 14. This causes the rollers to tend to roll toward the first, larger diameter, end of the clutch. When the rollers are urged to rotate in such direction, and because they are disposed in said annular volume at a preferred critical angle with respect to the contour of the inner and outer race surfaces 16 and 20, respectively, the threshold at which sliding contact between a cylindrical rolling member and a flat surface tends to cease, the rollers 26 bind virtually instantaneously between the confronting surfaces 16 and 20 and torque is thus transferred between the first and second members 14 and 18. Attempting relative rotation of the first and second members 14 and 18 in the opposite direction, indicated by arrow B in FIG. 2, causes the rollers 26 to rotate in the direction of arrow B1 relative to inner member 14, urging the rollers to roll away from the critical jamming angle created by the curving ramp surfaces 16 and 20 near the first end of the clutch and results in freewheeling of the second race member relative to the first.

Moreover, the clutch according to my invention may be assembled so as to provide engagement in one direction, while, upon disassembly, the rollers may be oppositely inclined to provide engagement in the opposite direction.

Inner race member 14 is adapted to be rigidly connected to an inner race element 40, which may be a shaft or any other element of a mechanism to or from which torque is to be transmitted in the locking mode. Likewise, outer race member 18 is adapted to be rigidly affixed to an outer race element 42 such as a sprocket or other element to or from which torque is to be transmitted in the locking mode. Suitable means for rigidly connecting said inner and outer race members 14 and 18 to race elements 40 and 42, respectively, should be provided. It is of course of primary importance that the race members 14 and 18 be so rigidly connected to respective race elements 40 and 42 that no or very little relative movement between one race member and its corresponding race element is permitted. To this end, the outer facing surface 20 of the outer race member 18 and inner facing surface 16 of the inner race member 14 may be coated, knurled, profiled, roughened, galvanized, toothed, splined, perforated, dimpled or otherwise prepared to mate compatibly with the corresponding surface contour of the race element.

Figure 4A:
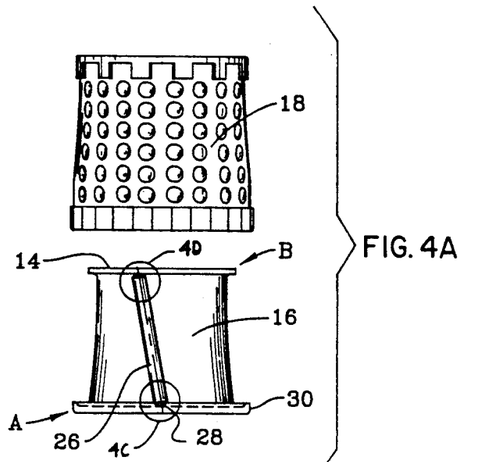
FIG. 4A is a partially exploded elevational view of a first embodiment of the instant invention.

FIG. 4A shows a first embodiment of the instant invention with the outer race 18 removed from the inner race member 14 to reveal the positioning of the rollers 26 relative to inner race surface 16 and the annular shoulder 30. Said annular shoulder 30 directly or indirectly supports the rollers axially and is integrally connected to the large diameter or first end A of inner race member 14, or may in turn be integrally connected to the large diameter or first end A of outer race member 18.

Figure 4B:
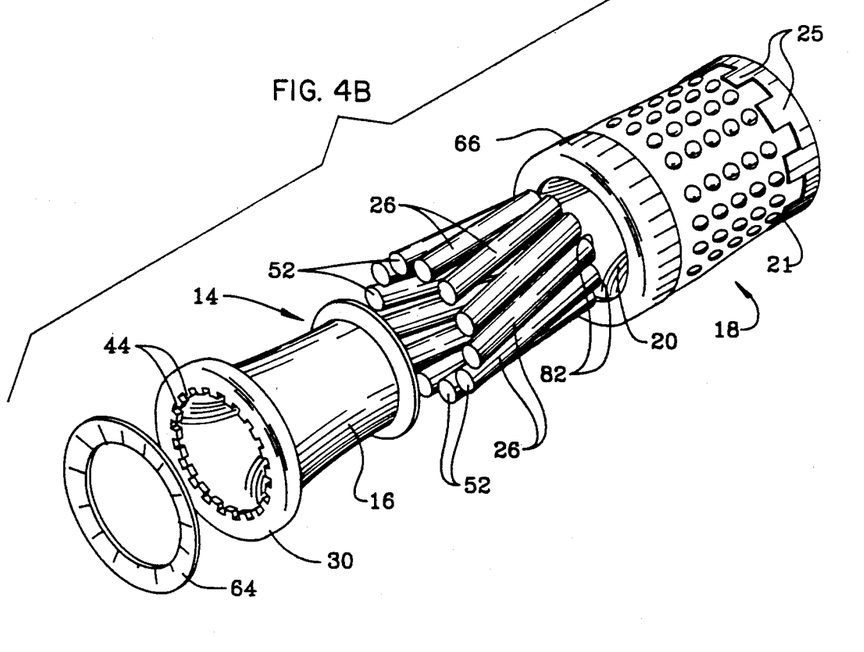
FIG. 4B is an exploded perspective view of the invention shown in FIG. 4A.

FIG. 4B shows an exploded view of the first embodiment of the instant invention shown in FIG. 4A. Rollers 26, all similarly inclined with respect to said radial planes, are disposed in surrounding relationship around inner race surface 16 and are supported axially at their first or lower ends 52 by an annular shoulder 30. In the preferred embodiment, ends 52 of rollers 26 are spherical or lens-shaped. In one embodiment, shown in FIGS. 5 and 6, the supporting surface 62 of annular shoulder 30 is formed to mate with the shape of ends 52 of rollers 26 so as to create essentially line contact therebetween. It is to be appreciated that this compact and simple to manufacture arrangement is particularly well suited for relatively low torque applications such as single sheet feed devices.

Figure 5:
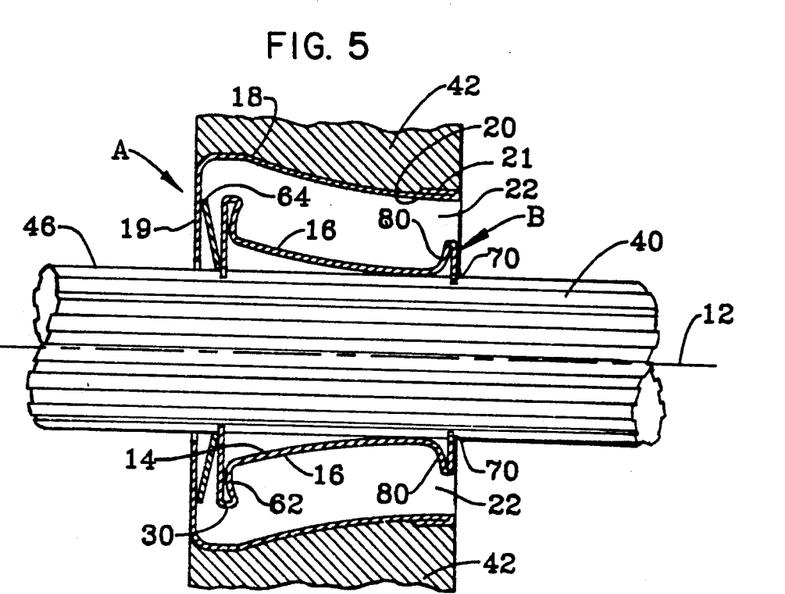
FIG. 5 is a cross-sectional elevational view of the clutch shown in FIG. 4A wherein the inner and outer race members are rigidly connected to inner and outer race members are rigidly connected to inner and outer race elements, respectively, omitting thrust transmitting rollers for clarity of illustration.
Figure 6:
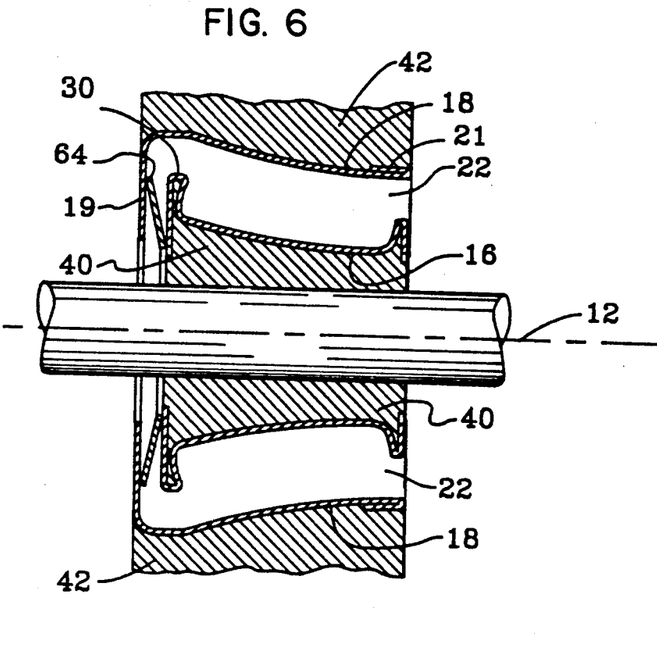
FIG. 6 is a cross-sectional view of the invention shown in FIG. 4A wherein the inner race member is rigidly connected to an alternative inner race element.

The conformity of contour between ends 52 and surface 62 is critical to the durability of the clutch disclosed herein as a non-conformingly shaped end 52 would cause gouging and eventual disablement of the clutch.

A second annular shoulder 32 may be employed at smaller diameter end B of inner race member 14 to support rollers 26 axially thereof against displacement from volume 22.

Inner race member 14 may, among other things, be provided with splines 44 adapted to mate with corresponding splines 46 on inner race element 40, shown in FIG. 5. Further, outer race member 18 may be provided with a knurled or otherwise treated outer shoulder member 66 and/or tooth-and-notch gripping means 25 connected to lip 21. Likewise, as shown in FIG. 4A, outer surface 19 of outer race member 18 may be treated to rigidly engage outer race element material 42 (shown in FIG. 5) in the case where element 42 is cast or molded about the outer periphery thereof so as to lockingly engage tooth-and-notch gripping means 25.

FIG. 5 shows a cross sectional view of the clutch of the instant invention wherein inner race member 14 is rigidly affixed, as with splines 44, in mating engagement with corresponding splines 46 of inner race element 40. Likewise, outer race member 18 is adapted to be positioned in surrounding relationship about inner race member 14 and is rigidly connected to outer race element 42, thereby locating outer race surface 20 in confronting relationship to inner race surface 16. Rollers 26 are disposed therebetween at the appropriate angle, which angle is a function of the diameter of said rollers, the diameter at the throat of the inner race (which may or may not be at smaller diameter end A), and the length of the clutch along the axis of rotation 12 thereof.

As best seen in FIG. 5, the clutch is comprised of inner and outer race members 14 and 18 that are stamped or otherwise formed out of thin, carbonized sheet steel, nylon, ceramic, suitable plastic or any other material bearing resistance to heat, friction and shear stresses. In this manner, the clutch of the instant invention is compact and of virtually negligible weight, yet is capable of transmitting torque of a magnitude many times greater than the clutches which the instant invention is designed to replace. Inner and/or outer race elements 40 and 42, respectively, may be cast or molded with race members 14 and 18, respectively, prepositioned.

As best seen in FIGS. 5 and 6, outer race member 18 has a downwardly bent annular retaining segment 19 connected to large end A thereof adapted to engage annular shoulder 30 of inner race member 14 to provide resistance against axial thrust forces imposed upon the clutch. In addition, engagement means 64 may be employed, such as a curved washer, a wave washer, or a Belleville washer, to act as a annular thrust element between leg 19 and shoulder 30 to assure proper alignment of inner member 14 relative to outer member 18.

As shown in FIG. 6, inner race element 40 may be an intermediate section of a sprocket which in turn is rigidly affixed by any convenient expedient to a shaft S which is positioned about axis 12 of the clutch. As the torque transmitted between inner and outer race members is dependent upon the number of rollers 26 used and the radius from the axis of rotation 12 to a point on any given roller 26, inner race element 40 may be of any desired diameter and may be molded or cast about inner race member 16 if indicated. The larger the diameter of element 40, the greater the torque capacity of the clutch due to the increased moment arm from axis 12 to the rollers and the increased number of rollers which may be used as the radius from axis 12 increases. It is contemplated herein that the inner race surface, and hence the rollers, may be located at any radius from the axis of rotation of the clutch as desired, and is only limited by the configuration of the device in which my clutch is used.

Figure 7:
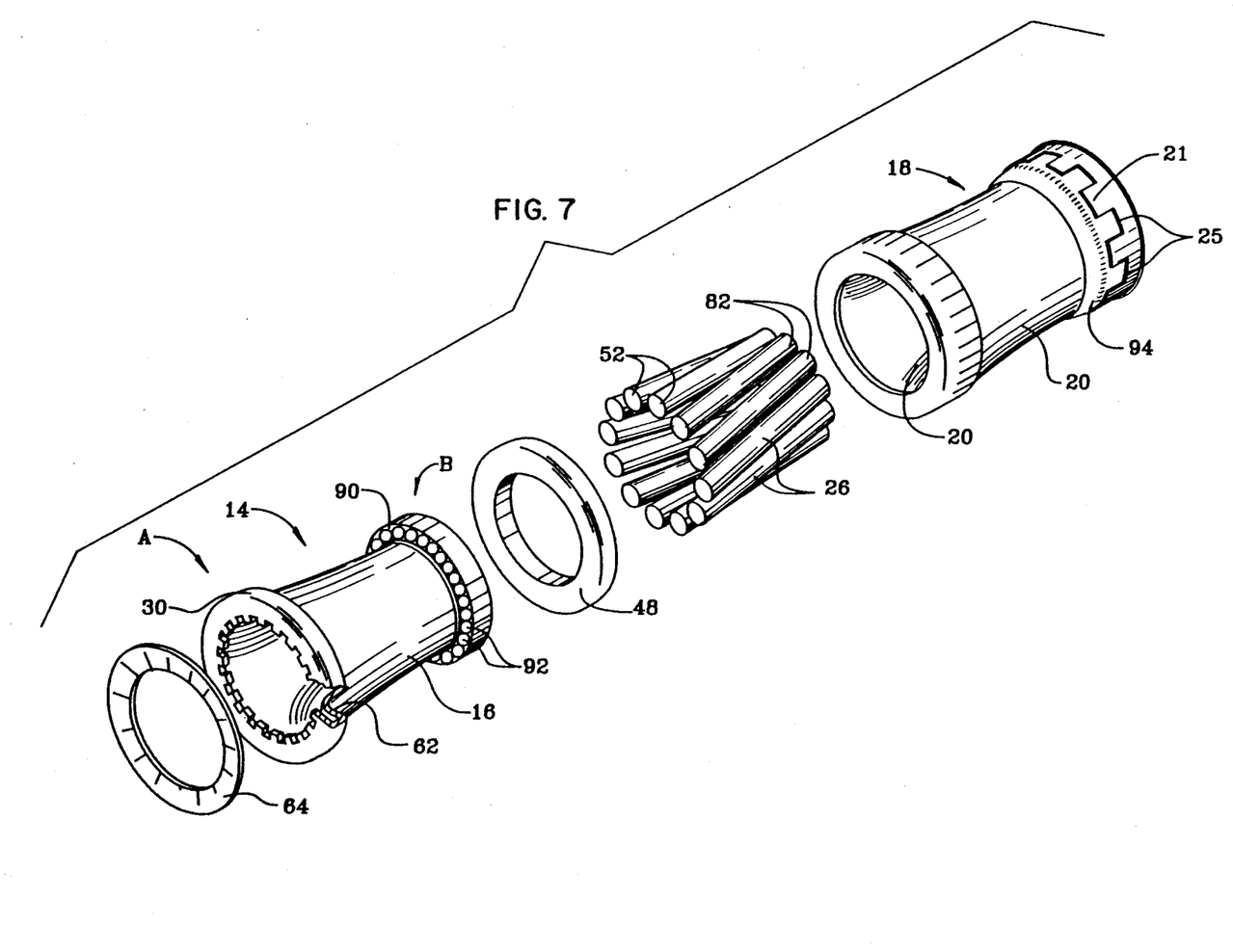
FIG. 7 is an exploded perspective view of a second embodiment of the clutch of the instant invention.
Figure 8:
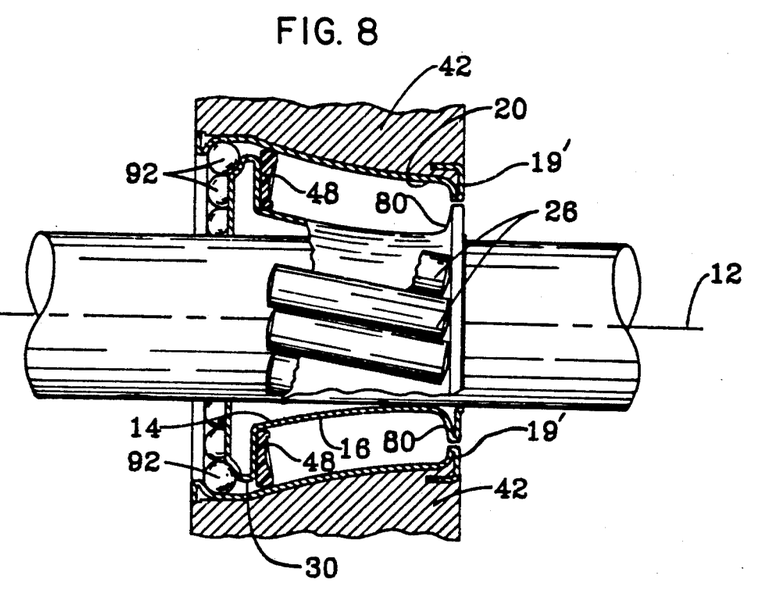
FIG. 8 is a cross-sectional elevational view of the second embodiment of the instant invention.
Figure 9:
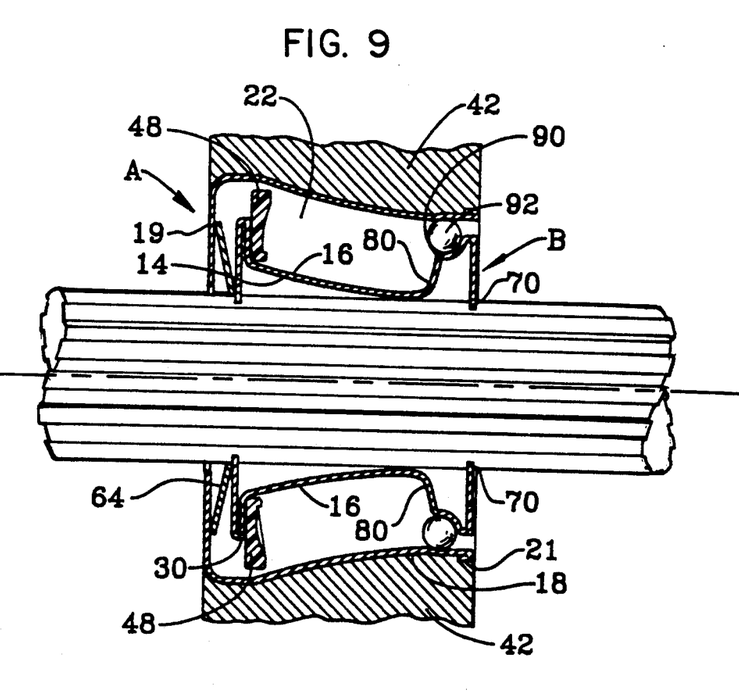
FIG. 9 is a cross-sectional elevational view of a third embodiment of the instant invention.

As shown in FIGS. 7-9, at the interface of end segments 52 of rollers 26 and the large end A of the clutch, such as annular ring 48, may be employed, preferably having pockets 50 disposed therein adapted to receive the end segments 52 of rollers 26 in nesting relation. Said annular bearing means or ring 48 is adapted to slidably engage shoulder 30. Therefore, it is preferred that ring 48 be constructed of a material suitable for such purpose, such as a self-lubricating composite. Ring 48 with its equally spaced receiving pockets 50 serves to maintain an equal spacing between rollers 26 to enhance the uniformity of operation of the clutch. It is most desired to employ a means at the interface such as ring 48 in applications where relatively high torque is to be transmitted between inner and outer race elements 40 and 42, respectively.

It should be noted that annular shoulder 30 may be integrally connected to outer race member 18 and not inner race member 14 in an alternative embodiment in which case ring 48 would ride upon shoulder 30' (not shown) of outer race member 18.

In an alternate embodiment, the clutch of the instant invention may be provided with an axial thrust bearing means such as the ball bearing arrangement shown in FIGS. 7 and 8. In such an arrangement, inner race member 14 has formed therein a secondary inner race 90 adjacent either the smaller diameter end B or larger diameter end A of the clutch, adapted to receive a plurality of spherical bearing elements 92. Outer race 18 has formed therein a secondary outer race 94 adapted to form a confronting surface to that formed by secondary inner race 90 and to act as an outer race against said spherical bearing elements 92.

As best seen in FIG. 8, the axial thrust bearing arrangement provides resistance to forces exerted on the clutch in the direction of axis 12.

FIG. 9 shows a third embodiment of the instant invention wherein the axial thrust bearing means is located at the first, larger diameter end of the clutch and is comprised of a plurality of both bearing members 102 slidably disposed between secondary inner race 100 and secondary outer race 104 connected to inner race member 14 and outer race member 18 respectively. The axial thrust bearing means provides resistance to forces exerted on the clutch in the direction of axis 12 similarly to the embodiment of FIGS. 7 and 8.

It can therefore be seen that the instant invention provides a lightweight, compact unidirectional clutch suitable for low cost mass production which acts as a bearing in the freewheeling mode yet which transmits torque in the lock-up mode. None of the prior art devices heretofore presented have provided the benefits and advantages inherent in the instant invention.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. A positive axial clutch including a first member having a surface of revolution about the axis of rotation of the clutch, which surface approximates a hyperboloid, a second member stamped or molded from a thin lightweight material having a surface of revolution about the axis of rotation of the clutch, said second member defining with said first member an annular space between confronting surfaces of the members, one of which is said surface of revolution of said first member and the other of which is said surface of revolution of said second member, a plurality of thrust transmitting roller disposed in said annular space so as to engage with the surfaces to make thrust transmitting contact between said confronting surfaces for driven rotation of said first or second member in at least one direction, said rollers each having a longitudinal rolling central axis, said hyperboloid from which said surfaces are derived being generated by using said central axes of said rollers as the straight line generators thereof, each roller contacting said surface of revolution of said first member along a generator of said surface or a line which approximates to such a generator, the rollers all being similarly inclined with respect to radial planes, means at an interface between at least one end portion of each of said rollers and at least one of said first and second members to permit slidable movement therebetween at least in a first direction while supporting the rollers axially thereof;

wherein said surfaces approximate generally conical hyperboloidal surfaces having a diameter at one end portion of each member greater than the diameter at the other end portion of the same member;

wherein said means at the interface between said rollers and at least one of said first and second members is a smoothly curving bearing surface defined by an annular support shoulder positioned adjacent first ends of said rollers at the larger diameter end of each member;

wherein said smoothly curving bearing surface conforms generally to the profile of the first ends of said rollers and is capable of sliding movement relative to said rollers;

wherein said annular support shoulder is capable of slidable rotation relative to at least one of said members so as to freely support said rollers rotatably relative to at least one of said members.

2. A positive axial clutch as in claim 1, wherein:

said first member is stamped or molded from a thin lightweight material.

* * * * *